June 30, 1970  K. SCHNEIDER ET AL  3,517,622
APPARATUS FOR FORMING AND ROLLING BAGEL DOUGH
Filed May 3, 1968  4 Sheets-Sheet 1
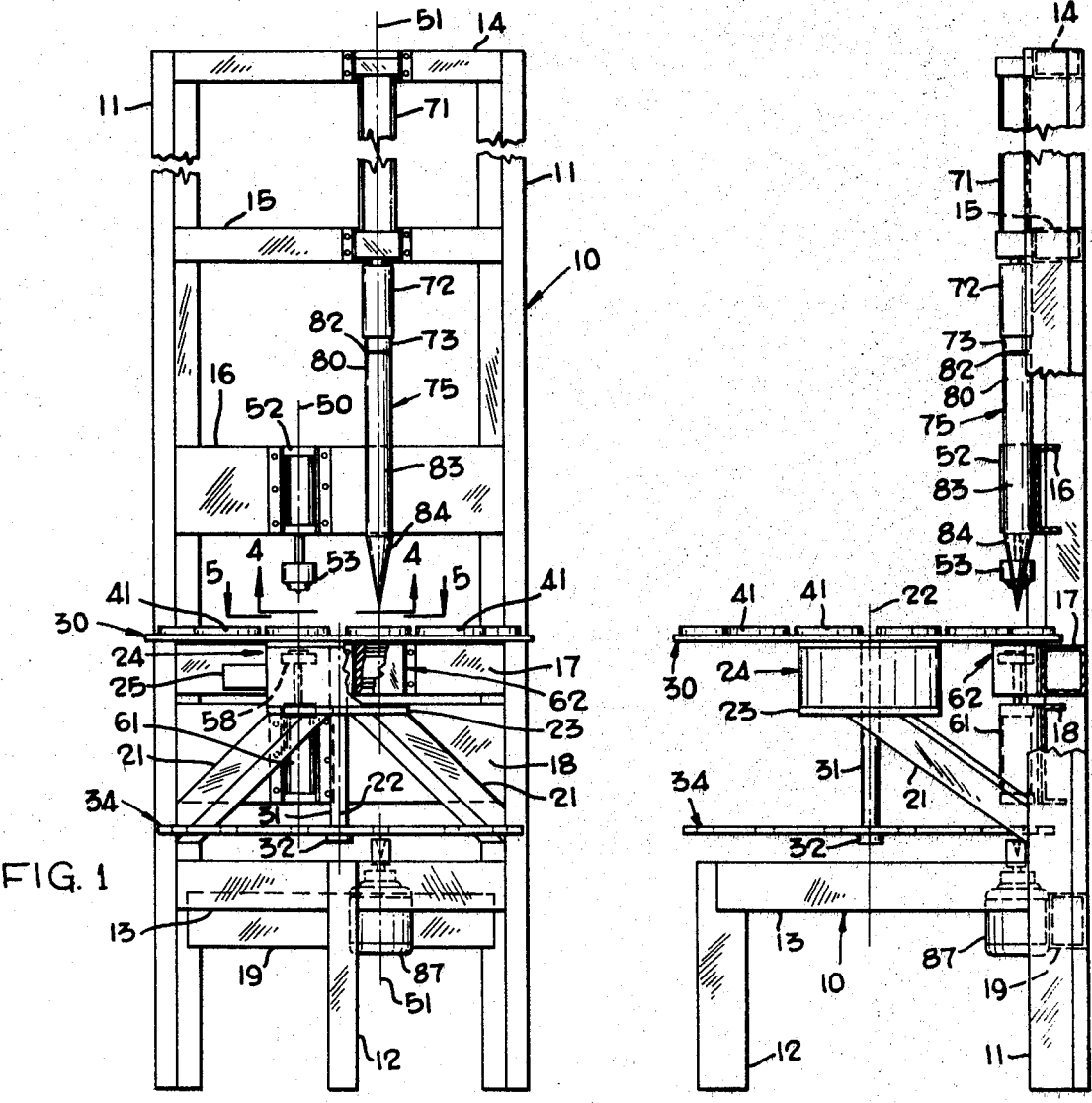
FIG. 1
FIG. 2
FIG. 3
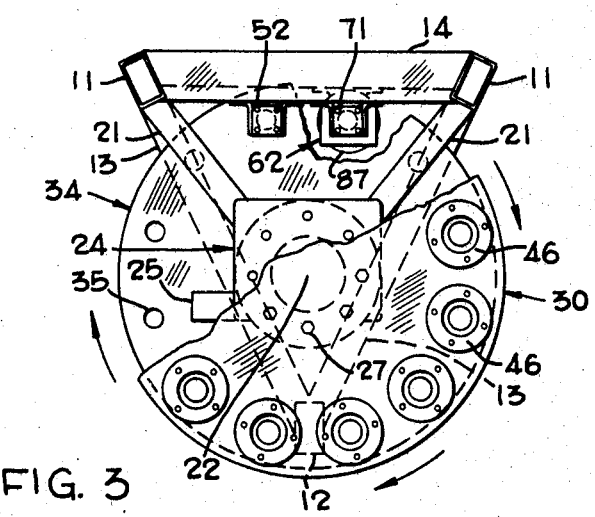
Inventors
KENNETH SCHNEIDER
MELVIN W. ENSOR
By
Attorney Inventors
KENNETH SCHNEIDER
MELVIN W. ENSOR

United States Patent Office 3,517,622
Patented June 30, 1970

3,517,622
APPARATUS FOR FORMING AND ROLLING BAGEL DOUGH
Kenneth Schneider, 7731 Wild Plum Lane, University City, Mo. 63130, and Melvin W. Ensor, St. Louis County, Mo.; said Ensor assignor to said Schneider
Filed May 3, 1968, Ser. No. 726,485
Int. Cl. A21c *11/00*
U.S. Cl. 107—4        10 Claims

ABSTRACT OF THE DISCLOSURE

Bagel dough is fed to a cavity having a deflectible bottom wall. At a first operating station, it is formed substantially into an annulus connected by a slotted membrane. At a second, rolling station, a taper tip mandrel, descending from above, penetrates the slotted membrane, smooths the membrane into the inner wall of the annulus, deflects the bottom of the body and rolls the annulus downward about the mandrel through a hollow member. Spinning the mandrel centrifugally enlarges the rolled annulus, to release it.

BACKGROUND OF THE INVENTION

Many machines have been devised for the purpose of forming and rolling bagel dough annuli. Problems in the design of such machines include: complexity, which makes such apparatus unduly expensive; excessive working of the dough, which may spoil the quality of the bagels; and forming to smooth exterior configuration. Suggested designs for such machines are shown in many U.S. patents, the following of which are typical:

Gendler, U.S. Pat. No. 1,755,921, in which the machine forms strips of dough and presses their ends together, then rolls them downward around a mandrel by belts drawn against the inner wall of a tube and moving downward within it.

Thompson, No. 2,584,514, in which the machine bends strips of dough around a circumferential notch at the mid-height of a mandrel and then pulls the mandrel downward through a hollow sleeve, to join the ends of the strip while rolling the annulus.

Chiwirut, No. 2,779,298, in which the machine works dough out of the annular bottom of a hopper, downward around a mandrel which extends downward between belts operating within a tube, for rolling in the same manner as with the Gendler machine.

Thompson, No. 3,031,979 (Reissue No. 25,536) in which a ball of dough dropped from a hopper, is spread circumferentially about the tapered upper end of a stationary mandrel supported at its mid-height. The spread strip is rolled downward by chain-driven rounded, hinged gripping members which open sufficiently to pass the mandrel support, below which the adjacent ends of the circumferentially spread dough are rolled together.

Paitchell, No. 3,080,831, in which a ball of dough is pushed onto a mandrel point, drawn upward around the mandrel by belts to roll it, and charged downward by reversing direction of the belt travel.

SUMMARY OF THE INVENTION

The present invention provides new apparatus for use by bakers in forming and rolling dough, without working it excessively, into annular shapes, as for bagels and the like.

The apparatus includes a forming station at which a mass of dough is formed, substantially into an annulus within a body having an annulus-forming cavity with opposed axial openings and positionable at the axis of the forming station. A center-indenting plunger is positioned normally above the body; an opposing plunger is raisable from below, to support an annular deflectible bottom wall of the cavity. A blade, the surface projecting from one of the two plungers, and extending radially outward from the axis, serves to space the two plungers apart at a minimum spacing. When they press together against a mass of dough in the cavity, they form it into an annulus with a cross membrane, slotted by the blade.

The body then transports the dough annulus laterally from the forming station to the axis of a rolling station. Here, an axially pivoted mandrel having a tapered tip at its lower end is mounted to move downward from above, through the deflectible bottom wall of the cavity into and through the inner wall of a grooved belled hollow therebeneath. Downward movement of the mandrel first causes its tapered tip to penetrate the slotted membrane and smooth it evenly outward to merge into the inner surface of the annulus; then to drive the annulus downward into and through the hollow means, in which it is rolled up on the mandrel. At the lower end of the mandrel stroke it engages a motor-driven coupling which spins it on its pivot. The resulting centrifugal force enlarges the dough annulus, disengaging and dropping it from the mandrel.

BRIEF DESCRIPTION OF THE DRAWINGS

FIG. 1 is a front elevation of a bagel dough forming and rolling apparatus embodying the present invention.

FIG. 2 is a side elevation thereof.

FIG. 3 is a plan view thereof.

DESCRIPTION OF THE PREFERRED EMBODIMENT

Figure 5:
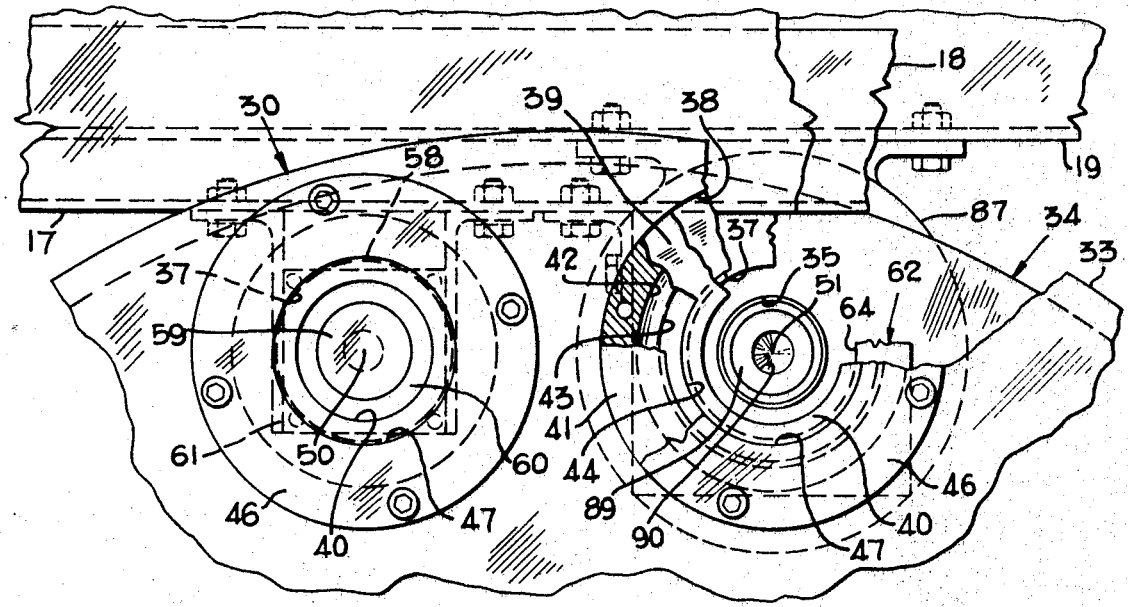
FIG. 5 is a similar section as seen looking downward along line 5—5 of FIG. 3.

For mounting the apparatus of the present invention, a three-legged frame generally designated 10 is employed, consisting of two tall upright members 11, a forwardly presented upright leg 12, and two horizontal beam supports 13 thereto. The tall upright members 11 are cross-braced by horizontal beams 14, 15, 16, 17, 18, 19, numbered from top to bottom.

Extending diagonally forward and upward, above the horizontal beams 13 to the forward leg 12, are converging table support brackets 21 whose intersection defines a vertical center line 22. Thereat, welded to the upper inner ends of the table support brackets 21, is a horizontal support plate 23 on which is supported a conventional rotary indexing mechanism generally designated 24 having an indexing actuator 25 adapted to rotate at precise angular increments which in the embodiment shown are 12 increments of 30° each.

Bolted onto the rotary indexing mechanism by a circle of bolts 27, as shown in FIG. 3, is a circular transport table generally designated 30. It is a heavy circular plate whose radius is less than the distance from the axis 22 to the upright side members 11. At its center is mounted a shaft 31 which extends downward through the center of the rotary indexing mechanism 24 and terminates in a lower end flange 32 slightly above the horizontal diagonal trussing supports 13. On this flange 32 is mounted a circular discharge conveyor table generally designated 34, to be described.

Figure 6:
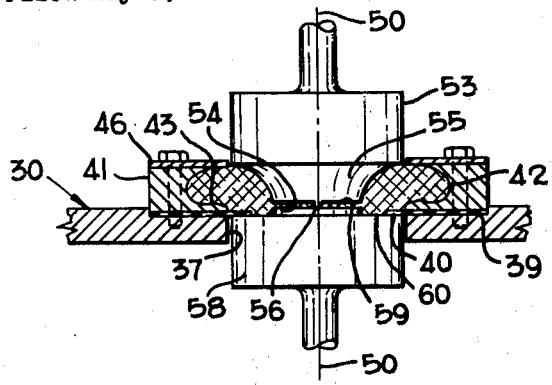
FIG. 6 is a similar enlarged fragmentary illustration, principally in section, showing a dough annulus being formed at the forming station.

Referring to FIGS. 5 and 6, the transport table 30 has near its perimeter edge 33, at 30° angular intervals, a plurality of means which serve as annulus-forming cavities to be described. These means include large vertical bores 37, about each of which a circular indentation 38, of larger diameter, is formed. In the indentations 38 and projecting somewhat inwardly into the bores 37, are flat annular or washer-like disks 39 of rubber or similar elastic deflectible material, which serve as annular bottom wall portions of the cavities, to be described, in which the bagel dough is retained and formed.

While the inner marginal portions 40 of the rubber washer-like disks 39 extend inward to a diameter smaller than the table bores 37, their portions outward of the table bores 37 are covered by shallow annular metal bodies 41 fitted in each circular indentation 38. Each of the bodies 41 has an inner concave cavity wall 42, so that its maximum circular cross-section is substantially greater in radius than the vertical table bores 37. The depth of each body 41 is relatively shallow, being much less than its radius. The concave cavity wall 42 is rounded to provide the desired outer diameter and thickness for the bagel annulus, although subsequent operations will affect the final dimensions of the annulus. Further, the cavity wall 42 has an upward projecting annular ridge 43 near its bottom outlet end 44. The outlet end 44 is narrowed to approximately the same diameter as that of the bores 37 in the transport table 30. Hence the marginal portions 40 of the rubber washer-like discs 39 which extend inwardly into the bores 37, serve as deflectible bottom wall portions for the cavity structure provided by the assembly of elements described.

Forming the top of each of the shallow bodies is an annular disk plate having a center opening 47 whose diameter approximately equals that of the cavity outlet end 44. The upper and lower openings 47, 44 serve as opposed axial openings leading into the cavity wall 42. Machine screws, as shown, secure each disk plate 46 and the shallow metal body 41 and rubber disk 40 to the circular transport table 30.

Impelled by its rotary indexing mechanism 24, the transport table 30 serves as a means to establish a support level for the dough annuli and to transport them to the forming station to be described, whose vertical axis is designated 50, and thence to a rolling station whose vertical axis is designated 51. Since the circular discharge conveyor table 34 is fixedly mounted to the shaft 31 and moves to the table 30, the indexing mechanism also serves to carry rolled dough annuli on the discharge conveyor table 34 away from the rolling station 51, in the clockwise direction indicated in FIG. 3, to be unloaded.

Figure 4:
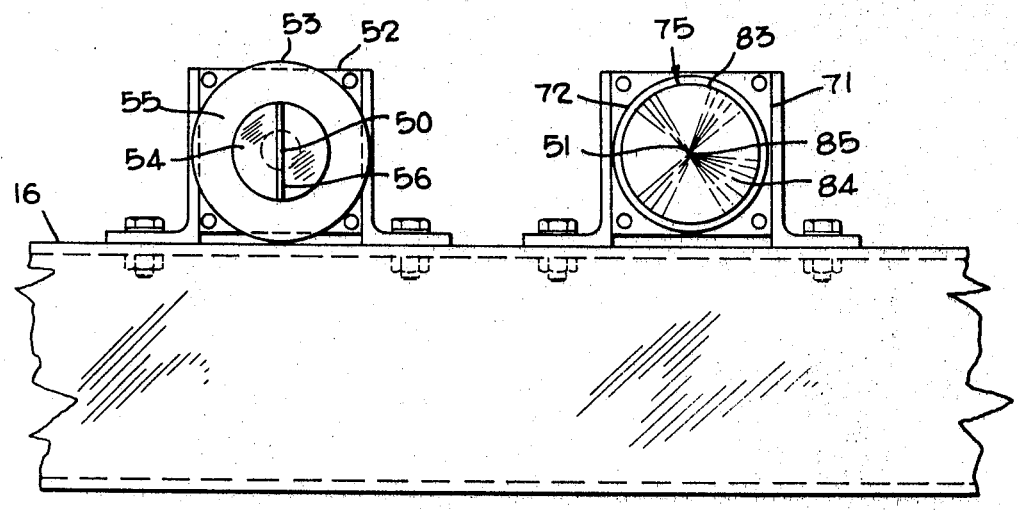
FIG. 4 is an enlarged fragmentary section of portions of apparatus at the forming and rolling stations, as seen looking upward along line 4—4 of FIG. 3.

The apparatus at the forming station axis 50 is best illustrated in FIGS. 1, 4 and 5. Mounted on the horizontal cross beam 16, well above the support level established by the transport table 30, is a pneumatic actuator 52 having a downwardly presented center indenting plunger 53. The plunger 53 reciprocates axially into and out of that outlet body which is indexed into position at the forming station axis 50, entering it through the center opening 47 of the top plate 46. The plunger 53 has at its center a horizontal downward presented surface portion 54, surrounded by a concavely rounded surface portion 55. At the juncture of this portion 55 with the outer diameter of the plunger 53, the plunger fits and projects downwardly within the center opening 47 of the plate 46, as seen in FIG. 6. Projecting downward from the plunger's center surface portion 54 is a blade 56 which in the preferred embodiment extends across the diameter of said center surface portion and downward a short predetermined distance.

Located along the forming station axis, normally below the table 30, is a reciprocating opposing plunger 58, of such diameter as to pass through the table bore 37 when elevated to the position shown in FIG. 6. The plunger upper surface includes a central flat opposing surface portion 59 which, when raised, enters within the body cavity 42 and presses against the blade 56. Annularly outward of the surface portion 59 is a slightly lower outer support surface portion 60. When the opposing plunger 58 is raised by its actuator 61, this annular outer surface portion 60 is presented supportingly against the under surface of the marginal portion 40 of the deflectible rubber washer 39. Conventional mechanism, not shown, supplies air pressure to actuate the plungers 53, 58 simultaneously toward each other and then away from each other, during each interval between indexed movements of the transport table 30.

The elements of apparatus at the rolling station 51 will now be described. Mounted closely beneath the circular transport table is means generally designated 62 providing a vertical hollow against whose inner wall each dough annulus is rolled. In the embodiment illustrated the hollow means 62 is a generally square metal block, shown in FIGS. 1, 2 and 5, bored to provide an inner wall 64 of circular cross-section, of the contour as herein shown and described. Best shown in FIGS. 7–11, inclusive, the inner wall 64 has an upper entrant end 65 which is sufficiently close beneath the rubber marginal portion 40 that when the latter is deflected downward, it serves to lead close to the entrant end 65. Below its entrant end 65 the inner wall 64 has a plurality of upper circular grooves 66 which serve as means to provide increased surface friction. Below these, the inner wall 64 is belled or rounded outward to a larger diameter portion, which, continues downward to similar circular grooves 68 near its rolled end. The inner wall 64 terminates in an enlarged belled bottom exit portion 69. If desired, the entire surface of the inner wall 64 may be scored or otherwise provided with a roughened surface.

Figure 10:
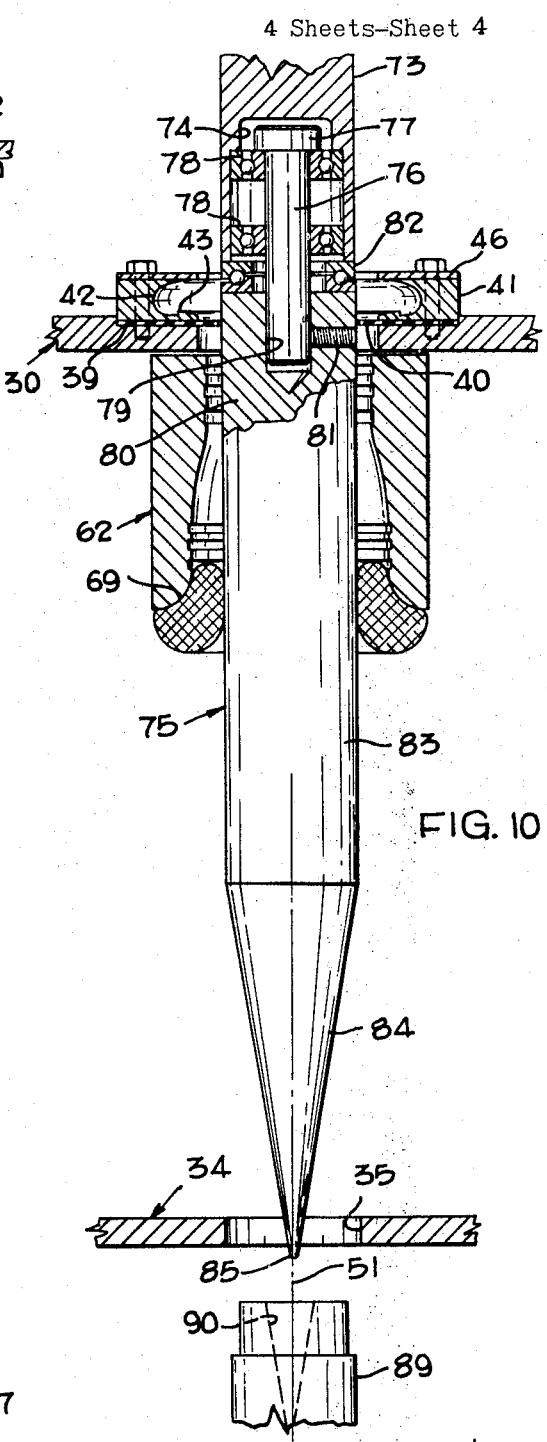
FIG. 10 is a similar view showing the rolled dough annulus emerging from the bottom of the hollow member.

Above the support level and mounted on the upper horizontal beams 14, 15 is an elongated pneumatic mandrel actuator 71 aligned with the rolling station axis 51 and having at its lower end a coupling 72. The coupling 72 holds the stationary upper part 73 of a rotatable mandrel generally designated 75. As best shown in FIG. 10, the mandrel 75 has an axial pivot pin 76 whose head 77 is retained within a hollow 74 in the upper mandrel part 73 by a press fitted bearing 78, which aligns and permits rotation of the pivot pin 76. The pin 76 extends thence downward and is secured within a bore 79 in a rotatable lower mandrel portion 80; for this purpose one or more set screws 81 are utilized. Mounted on the pin 76 between the lower end of the stationary part 73 and the upper end of the rotatable mandrel part 80 is a thrust bearing 82.

Beneath its upper end, the rotatable part 80 has an elongated preferably knurled cylindrical dough-rolling portion 83 whose diameter is nearly that of the inner diameter of the ruber washer 39. The length of the cylindrical portion 83 is, at o minimum, that length required for the rolled dough annulus to emerge below the belled exit portion 69 of the hollow member 62, increased by the amount necessary to accommodate relative upward rolling on it of the dough annulus. At its lower end is an elongated, conically tapered tip portion 84 terminating in a tip point 85.

Figure 11:
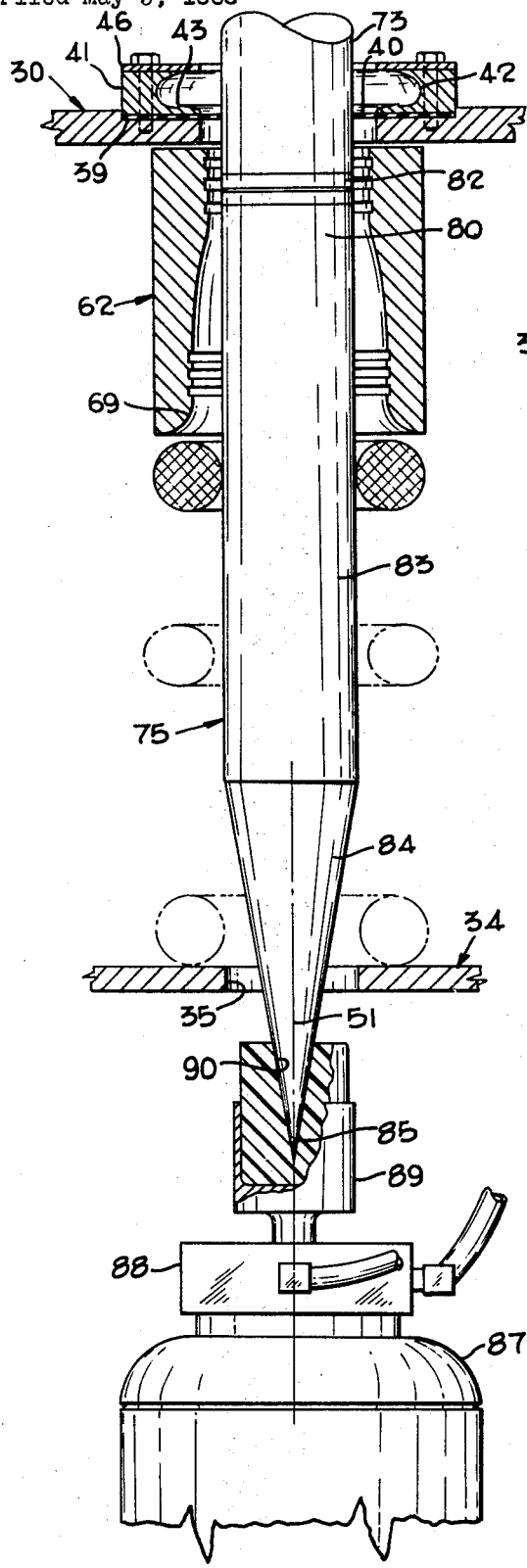
FIG. 11 is a view showing the rolled dough annulus being dislodged from the rotating mandrel by centrifugal force, the dashed lines showing it dropping to the conveyor table beneath.

The stroke of the mandrel actuator 71 reciprocates the rotatable mandrel portion 80 from an upper limit, at which its lower end tip 85 is above the support level provided by the transport table and its cavity top plates 46, downward to a lower limit at which its rolling stroke has been completed, shown in FIG. 11. The mandrel part 80 is then caused to rotate, as will be described.

Along the axis 51 below the level of the discharge conveyor table 34 there is mounted from the lowermost cross beam 19, an electric motor 87 having its shaft aligned with the axis 51. At the upper end of the motor shaft, a pneumatic clutch 88 mounts an upward presented coupling 89 which has a top center conical indentation 90, as shown in FIGS. 1, 2 and 11. The coupling is formed of a material which exerts torsional friction on the mandrel tip 85. Referring to FIGS. 5 and 11, the discharge conveyor table 34 has circular table bores 35 slightly smaller in size than the transport table bores 37 and located in registration with them. When the mandrel 75 is in its lower limit position, shown in FIG. 11, the mandrel tapered portion 84 passes through one of the table bores 35, and its tip 85 engages frictionally within the center indentation 90 of the coupling 89. The pneumatic clutch 88 is engaged by pressure applied through conventional tubing connection, not shown, to the mandrel actuator 71 when the latter reaches the lower end of its stroke. Pneumatic actuators which so function to supply pressure to a clutch are commercially available.

The functioning of the apparatus will now be described. At the forward side of the circular transport table (the lower side shown in FIG. 3) a ball-like mass of dough is fed into each of the shallow bodies 41 by dropping it through the top annular plate 46 onto the annular rubber margin 40. The table 30 turns in 30° indexed increments in the direction shown by the arrows in FIG. 3, carrying each ball of dough first to the forming station axis 50 and then to the rolling station axis 51. Within the time intervals between indexed movements the upper pneumatic actuator 52 and opposing actuator 61 at the forming station axis 51 are simultaneously actuated toward the support level by a source of air under pressure, not shown. When so actuated they drive into the upper and lower end openings of the bodies 41 in which the dough is supported, to meet as shown in FIG. 6. By their combined action the dough is formed radially outward as an annulus which substantially fills the cavity wall 42, while a thin membrane is formed between the opposed plunger surfaces 54, 59 and slotted by the blade 56. The actuators 52, 61 are then automatically reversed by conventional mechanisms, not shown, to withdraw the center indenting plunger 53 upward and the opposing plunger 58 downward, leaving the dough formed to the cross-section shown in FIG. 6. The table 30 then moves another 30°, and as the next dough ball is brought to the forming station axis 50, the formed dough annulus is transported to the rolling station axis 51. During the same time interval, between indexed movements, the pneumatic mandrel actuator 71 is actuated, driving the mandrel 75 downward to perform the operations shown in FIGS. 7 to 11 on that dough annulus at the rolling station which has in the previous interval been formed at the forming station.

Figure 7:
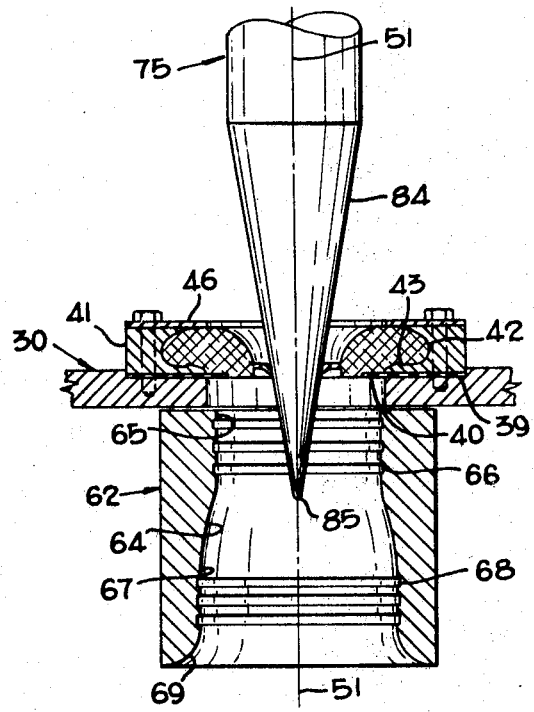
FIG. 7 is a similar illustration, principally in section, showing the formed dough annulus at the rolling station, as the mandrel descends preliminary to rolling.
Figure 8:
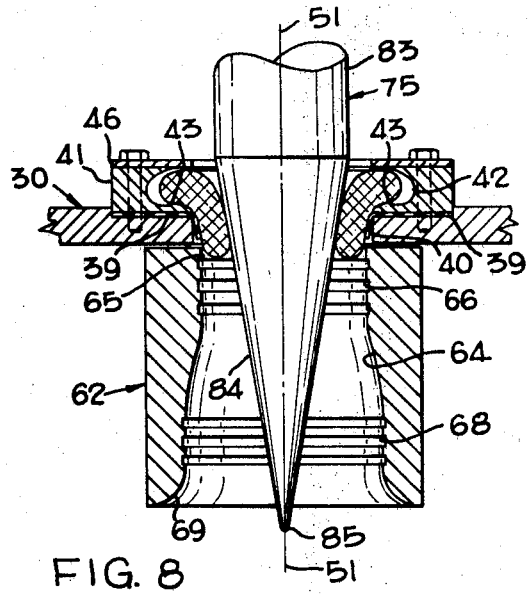
FIG. 8 is a similar view at the rolling station, showing the first stage of rolling thereof.

FIG. 7 illustrates the first function of the mandrel 75. Its tip 85 penetrates the slot in the membrane of the dough annulus, and its tapered portion 84 then compresses the slotted dough membrane portions sideward into the inner surface of the dough annulus. Because of their radial slotting, the membrane portions merge smoothly and evenly into the annulus as rolled. As the mandrel 75 continues to move downward, its conical tip portion 84 exerts a force against the inner wall of the dough annulus to press it downward; this deflects the rubber deflectible bottom wall portion 40 downward as shown in FIG. 8; and the dough annulus commences to roll relatively upward along the mandrel 75 as it is turned inward and rolled downward out of the cavity 42. The projecting annular ridge 43 in the lower cavity surface 42 prevents inward sliding of the under surface of the dough annulus; hence the downward force exerted by the tapered tip portion 84 rolls the annulus up the taper 84 to the cylindrical dough-rolling portion 83.

Figure 9:
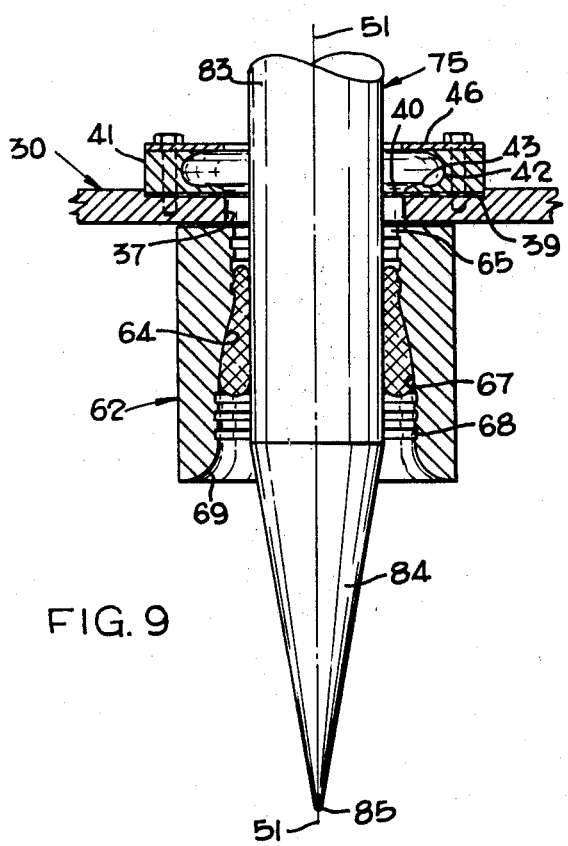
FIG. 9 is a subsequent view thereat with the dough annulus mid-way through the hollow member in which it is rolled.

As the mandrel 75 continues to descend, as shown in FIG. 9, the cylindrical dough rolling surface portion 83 continues to roll the inner surface of the dough annulus downward as its outer surface is restrained from slippage by frictional contact with the inner wall 64 of the hollow member 62. The rolling causes the dough annulus to turn inside out at least once. In the smaller diameter upper portion of the wall 64 the dough is fairly lightly kneaded; when the dough reaches the larger diameter portion 67, the kneading force is lessened. As it emerges from the belled bottom exit portion 69, as shown in FIG. 10, it assumes its final rounded shape, shown in solid lines in FIG. 11, its periphery smooth and unmarked. The somewhat elastic dough annulus is then dislodged from the mandrel 75 without marring its smoothly rolled outer surface.

In rolling the dough out of the bottom exit portion 69, the mandrel tip 85 has passed through a circular bore 35 in the discharge conveyor table 34, to engage within the center indentation 90 of the coupling 89. As the mandrel 75 reaches its lowest point, pressure from its pneumatic actuator 71 is communicated to actuate the pneumatic clutch 88 driven by the continuously operating motor 87. The rotatable mandrel part 80 is thus caused to rotate at a rate sufficiently rapid that centrifugal force exerted on the annulus enlarges its diameter. So enlarged, it falls as shown in dashed lines in FIG. 11, downward beyond the cylindrical mandrel portion 73 and onto the discharge conveyor table 34. As it comes to rest the elasticity of the dough draws it inward to at least its original diameter; however, since it is now opposite the tapered portion 84 of the mandrel 75, this elasticity will not cause it to re-engage the mandrel. It will be apparent that the discharge conveyor table 34 is to be located at such a level below the transport table 30 that when the dough annulus has emerged from the hollow means 62, the tapered mandrel portion 84 will extend with clearance through the conveyor table bore 35, as shown in FIG. 11; and the coupling 89 must be at such level as to then engage the tip 85. The mandrel 75 is then returned upward to its original position.

The indexing mechanism 24 turns the transport table 30 and discharge conveyor table 34 together another 30°, moving the finally rolled dough annulus clockwise from the position shown in FIG. 11, so that it may be removed at the convenience of the operator, and transporting another formed dough annulus from the forming station axis 50 to the rolling station axis 51.

While this description is of a simple preferred embodiment of the invention, many changes in apparatus will suggest themselves which fall within the teachings of the invention. Thus, rigidly coupling the transport table 30 and discharge conveyor table 34 together on a central rotating shaft is merely one convenient method of carrying out their obvious functions; similarly, mechanisms other than those described may be utilized for the other functions taught herein. Accordingly, this invention is not to be construed narrowly, but rather as co-extensive with the claims hereof.

What is claimed is:

1. An apparatus for forming and rolling bagel dough and the like, comprising
a forming station, a rolling station, and means to establish a support level for a dough annulus and to transport such annulus from the forming station to the rolling station at such support level,
the rolling station being spaced laterally from the forming station, the rolling station including
a vertical rolling station axis,
mandrel means having a tip at its lower end and being reciprocable along said axis to move its tip downward from above said support level to below said support level, and
hollow means having an inner wall of circular cross-section positioned concentric with said rolling station axis beneath and adjacent to said support level,
the means to transport including
a body having a cavity of circular cross-section greater in diameter than that of the inner wall of said hollow means beneath the support level at the rolling station, and having
a deflectible bottom wall portion including a central opening,
the forming station including means cooperating with said body and the deflectible bottom wall portion to form a mass of dough substantially into an annulus,
whereby a dough annulus transported by said body from the forming station to the rolling station, and whose outer diameter substantially fills the cavity, may be driven downward by the mandrel means on deflection of the bottom wall portion of the body, into and through the hollow means and thereby be rolled onto the mandrel means by the inner wall of said hollow means, together with
means to dislodge such rolled dough annulus from the mandrel means.

2. An apparatus for forming bagel dough substantially into an annulus, comprising:
a forming station having a vertical axis,
a body positionable thereat and having an annulus-forming cavity of circular cross-section and of a depth less than its radius, and having opposed axial openings,
a center-indenting plunger reciprocable axially into said cavity through one of said openings when the body is positioned at the forming station, said plunger being positioned normally above the body and having a downward presented indenting surface, and
an opposing plunger reciprocable axially to the other opening from below and having an upper central opposing surface positioned, when raised, at and within the bottom opening of the body,
whereby to oppose the center-indenting plunger and by their combined action to form the dough radially outward to substantially fill the cavity, together with
means operable between the indenting surface of the center-indenting plunger and the central surface of the opposing plunger to space said surface apart at a predetermined membrane-forming spacing, such means including
a blade extending radially outward from the forming station axis,
whereby to slot the dough membrane so formed.

3. Apparatus for rolling a bagel dough annulus and the like, comprising:
a rolling station including
means to establish a support level preliminary to rolling,
a vertical rolling station axis,
mandrel means having a tip at its lower end and reciprocable along said axis to move its tip downward from above said support level to below said support level, and
hollow means having an inner wall of circular cross-section positioned concentric with said rolling station axis beneath and adjacent to said support level, together with
a body positionable at said support level along said axis and having a support cavity of circular cross-section, a top opening therein, having a circular central opening of sufficient diameter to accommodate said mandrel means, and a deflectible bottom wall,
the circular cross-section of the support cavity being greater in diameter than that of the inner wall of said hollow means beneath the support level,
whereby on downward movement of the mandrel, and deflection of the bottom wall portion, a dough annulus is peripherally constricted on entering the hollow means, and thereby caused to roll between the mandrel and the inner wall of the hollow means.

4. The apparatus for rolling a bagel dough annulus and the like as defined in claim 3, wherein:
the hollow means has an upper entrant end at a level spaced beneath said deflectible bottom portion at a distance nearly equal to the annular width thereof,
whereby as the mandrel exerts downward force on such a dough annulus, said bottom wall deflects downward to lead into the entrant end of said hollow means.

5. The apparatus as defined in claim 3, wherein:
the mandrel means has a tapered force-exerting portion adjacent to its downward tip, and
the deflectible bottom wall of the body is secured to and beneath the body,
whereby to form an annular lower wall of the support cavity which deflects downward and elastically enlarges its central bottom opening when pressure is applied by the tapered mandrel portion to roll a dough annulus therethrough.

6. The apparatus as defined in claim 3, wherein:
the hollow means has a belled bottom exit portion of greater diameter than the portion thereabove,
whereby to complete rolling along the mandrel with gradually lessened rolling pressure, thereby to avoid marking the periphery of the rolled annulus.

7. The apparatus as defined in claim 3, wherein:
the mandrel means having a dough-rolling portion adjacent to its tip, a support spaced therefrom, and a vertical pivot therebetween, together with
means engageable to the dough-rolling portion to rotate same on the pivot,
whereby to subject a dough annulus thereon to centrifugal force, thereby to enlarge it diametrically and dislodge it.

8. A dough annulus rolling apparatus comprising a hollow means having an inner surface of circular cross-section, a mandrel means rotatable on its axis and displaceable axially relative to said hollow means, means to move said mandrel means axially of said hollow means and means to rotate the mandrel means about its axis whereby a dough annulus thereon will have its diameter enlarged by centrifugal force.

9. The invention as defined in claim 8,
wherein said mandrel means has a vertical axis and a lower end tip and wherein relative axial displacement through the hollow means includes downward movement thereof,
said means to rotate the mandrel means comprising:
coupling means engageable to the lower end tip of the mandrel means at the lowermost portion of its axial displacement, and power means to rotate said coupling means.

10. The invention as defined in claim 9, wherein:

the lower end tip of the mandrel means is tapered, together with discharge conveyor means below said hollow means and spaced at a level above said coupling means a distance less than the tapered length of the mandrel tip, the discharge conveyor means having an opening positionable in registration with the mandrel axis, whereby on downward movement of the mandrel tip through said opening to engage the coupling means, a dough annulus, elastically enlarged by centrifugal force and fallen onto the conveyor means around the tapered tip, will remain free of said mandrel means.

References Cited

UNITED STATES PATENTS

| 2,779,298 | 1/1957 | Chwirut et al. | |
| 3,371,624 | 3/1968 | Thompson | 107—8 |
| 3,379,142 | 4/1968 | Reiter et al. | 107—8 |
| 3,407,754 | 10/1968 | Wichinsky | 107—8 |

WALTER A. SCHEEL, Primary Examiner

R. I. SMITH, Assistant Examiner

U.S. Cl. X.R.

107—8